US007270605B2

(12) United States Patent
Russell et al.

(10) Patent No.: US 7,270,605 B2
(45) Date of Patent: Sep. 18, 2007

(54) PEER-TO-PEER GAMING SYSTEM

(75) Inventors: Glen Keith Russell, Las Vegas, NV (US); Michael B. Shelby, Corvallis, OR (US); R. Jeffrey Jordan, Las Vegas, NV (US); James R. Norton, Corvallis, OR (US)

(73) Assignee: GT, Reno, NV (US)

( * ) Notice: Subject to any disclaimer, the term of this patent is extended or adjusted under 35 U.S.C. 154(b) by 56 days.

(21) Appl. No.: 10/615,732

(22) Filed: Jul. 8, 2003

(65) Prior Publication Data

US 2005/0009607 A1 Jan. 13, 2005

(51) Int. Cl.
*A63F 13/00* (2006.01)

(52) U.S. Cl. ........................................................ 463/40

(58) Field of Classification Search .................. 463/40, 463/42–43, 47

See application file for complete search history.

(56) References Cited

U.S. PATENT DOCUMENTS

| | | | | |
|---|---|---|---|---|
| 4,572,509 | A | 2/1986 | Sitrick | |
| 5,970,143 | A | 10/1999 | Schneier et al. | |
| 6,128,660 | A | 10/2000 | Grimm | |
| 6,251,014 | B1 | 6/2001 | Stockdale et al. | |
| 6,371,850 | B1 | 4/2002 | Sonoda | |
| 6,443,839 | B2 | 9/2002 | Stockdale et al. | |
| 6,503,147 | B1 | 1/2003 | Stockdale et al. | |
| 2002/0155884 | A1 | 10/2002 | Updike | |
| 2002/0165023 | A1 | 11/2002 | Brosnan et al. | |
| 2002/0187830 | A1 * | 12/2002 | Stockdale et al. | 463/29 |
| 2003/0014370 | A1 * | 1/2003 | Charrin | 705/65 |
| 2003/0054880 | A1 | 3/2003 | Lam et al. | |
| 2003/0064806 | A1 * | 4/2003 | Gordon et al. | 463/42 |
| 2003/0176213 | A1 | 9/2003 | LeMay et al. | |
| 2004/0238319 | A1 * | 12/2004 | Hand et al. | 194/207 |

FOREIGN PATENT DOCUMENTS

| | | |
|---|---|---|
| FR | 2831378 | 4/2003 |
| GB | 2 384 719 | 6/2003 |
| WO | WO 98/11686 | 3/1998 |
| WO | WO 99/66413 | 12/1999 |
| WO | WO 01/33901 | 10/2001 |

OTHER PUBLICATIONS

Gowan, Michael, *How It Works: IEEE* 1394, *Our latest tech primer explains how fast IEEE* 1394 (*aka FireWire*) *can go and how to get it* Dec. 20, 1999.

* cited by examiner

*Primary Examiner*—Kim Nguyen
(74) *Attorney, Agent, or Firm*—Beyer Weaver & Thomas LLP

(57) ABSTRACT

A gaming system is disclosed. The gaming system includes at least two gaming components. Each gaming component includes a controller and a communications interface. The gaming system also includes a communication link to allow the controllers of the gaming components to communicate with other controllers of other gaming components on a peer-to-peer basis through the communication interfaces.

20 Claims, 2 Drawing Sheets

PEER-TO-PEER GAMING SYSTEM

BACKGROUND

With newer video gaming systems, graphics and sound embody exciting gaming experiences. As games grow in complexity, the gaming systems need more processing power and the image and sound files begin to take up more storage space. Patrons want newer and more complex features as well as more dynamic content. This fuels the continual need to upgrade gaming devices with more powerful processing, video, sound, and storage components. In such a cost conscious industry, the need for more dynamic content and the cost of the platform to support that content can often lead to decisions which delay the release of newer titles which in turn can significantly impact revenues.

It is not unusual to have image and sound files consume megabytes of storage. The storage of these files at the local level, as is currently done, does not lend itself well to evolving content. The massive size of the data precludes continual storage in main memory. As storage is moved away from the local gaming console, bandwidth requirements for faster, more exciting games have become critical. The gaming environment will be moving towards a more distributed environment, where central servers provide content, storage, and management capabilities for the gaming systems.

In addition to sharing storage, the gaming systems may have the ability to share components, such as a camera overseeing a number of gaming systems grouped together.

In addition, the gaming environment may benefit from gaming systems that are reconfigurable and adaptable, based on a peer-to-peer communications system, rather than client/server. Shared and local components in these types of systems may be added and removed from gaming systems for reconfiguration or maintenance requirements, with little or no effect on the performance of the gaming system. This would allow increased flexibility and provide more options for an exciting gaming environment.

Finally, the ability to offload processing to local and/or remote peripherals in a peer-to-peer communications systems reduces the processing power needed for critical game functionality as is currently utilized in a traditional gaming system. The advent of a system that allows for the distribution of processing and/or storage to peripheral components, thus breaking the need for the continual upgrade cycle, can significantly improve the bottom line revenues of a manufacturer.

SUMMARY

One embodiment of the invention is a gaming system. The gaming system includes at least two gaming components. Each gaming component includes a controller and a communications interface. The gaming system also includes a communication link to allow the controllers of the gaming components to communicate with other controllers of other gaming components on a peer-to-peer basis through the communication interfaces.

Another embodiment of the invention is a gaming system with two communications links. An interior communications link provides communications to gaming components arranged inside a cabinet. An exterior communications link provides communications to gaming components located outside the cabinet. A bridge provides physical connection between the interior and exterior communications links.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
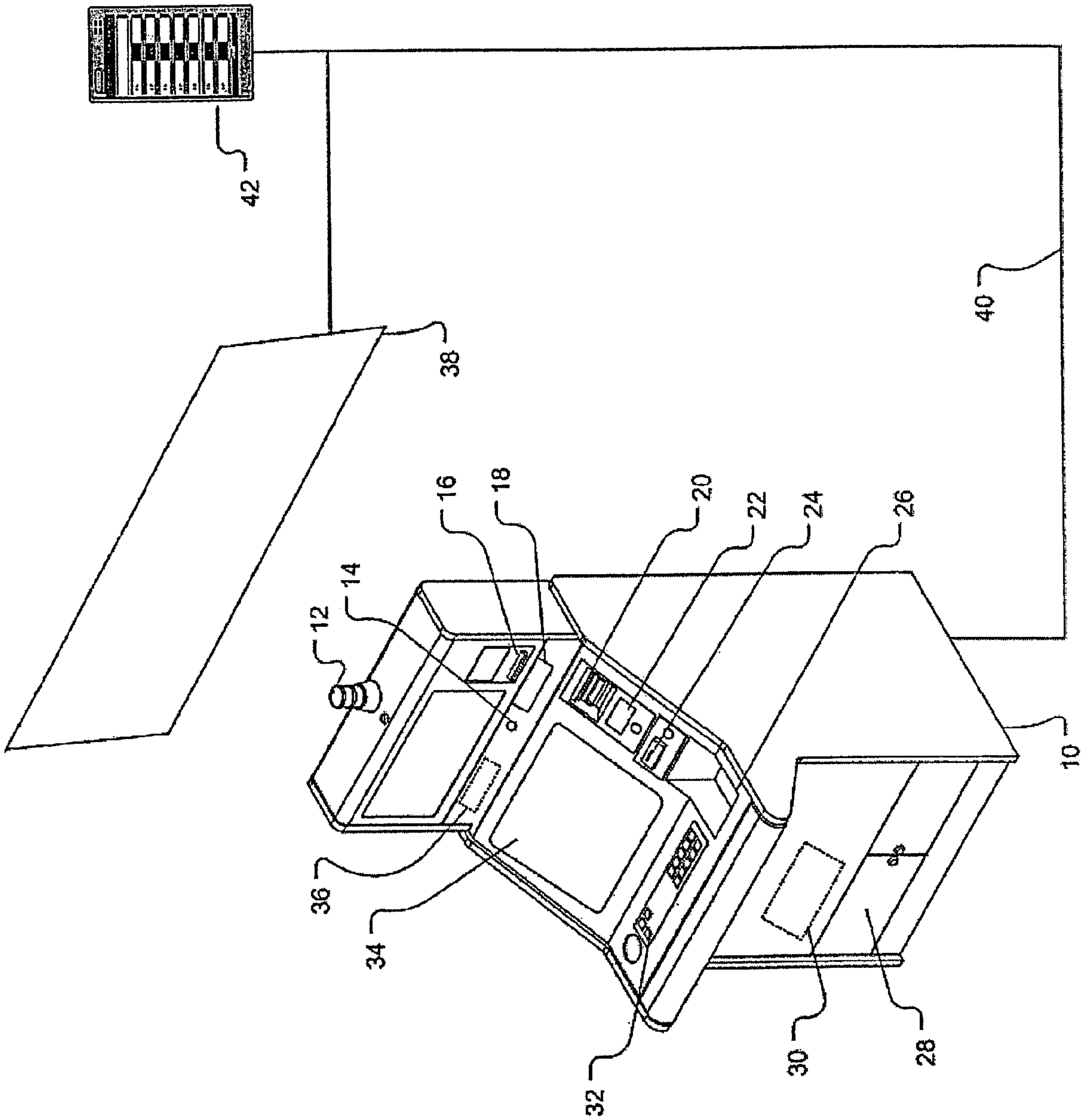
FIG. 1 shows an embodiment of a gaming system having interior and exterior gaming components.

FIG. 1 shows an embodiment of a gaming system having both exterior and interior components. The gaming system may have several components to provide gaming services to users, whom may also be referred to as players. In this particular example, the gaming system has a cabinet 10, in which are arranged several gaming components. The following discussion gives examples of gaming components and their possible uses. This is not intended to limit either the configuration of a gaming system to these specific gaming components or to limit the uses of the gaming components to the examples given of their possible uses.

A light or candle 12 may indicate if the game is active, if there is a winner, or to identify a system needing service. A camera 14 may be used to monitor the players, capture video of winners, etc. The camera could be a video camera providing live feed to an image processing gaming component that translated the input images from the camera into images that could be used in the game. For example, an input stream from the camera of a user becoming a winner could be used as input to a bonus game that had images of the user as part of the game.

Similarly, the camera could be a still camera, a combination of both, and either an analog or digital input device. In another example, the video camera could project images of a winner on one of the games to a shared overhead display, enticing others to come play the games. Another example may be the broadcast of a centralized video capture of a game to a centralized display, to several distributed displays and a recording device. This example may provide images of a mechanical or animated roulette table and several betting stations.

Speakers 18 may provide music, sound effects or voice instructions to the players, and the system may also have a microphone. A printer 16 provides the capability to printout tickets that generally are used to provide the player with a voucher and may be used to print out other items, such as promotional awards, prize certificates, etc. The voucher can be redeemed for cash. A bill acceptor 20 and a coin acceptor 24 allow the user to insert money to be wagered on the games. The bill acceptor and coin acceptor will also generally validate the coins and bills to ensure that the currency inserted is valid, as well as tracking the amount of currency being inserted. The component referred to here as a bill acceptor may also serve a dual function as a ticket reader. A bill door 22 may provide access to the bill stacker for maintenance functions. A coin hopper 26 dispenses coins when the player cashes out their accumulated winnings Other types of gaming components could include 'networked' printers that are controlled by a central system. For example, the printing of a promotional ticket may be done on a printer usually controlled by the game processing unit. When the main system communicates with the printer, it can do so without involving the game processing unit, and the main system may actually take control of the printer away from the game processing unit. This may also be true for commands to print tickets of a certain amount/value, where those commands come from a central accounting system, not the local gaming system or game processing unit. In a configuration such as that shown in FIG. 2, there would not need to be any special wiring or harnessing in the cabinet.

Other gaming components could include keypads, either for security or other uses; biometric devices for identification and security, such as fingerprint scanners, facial recognition modules, voice print identifiers, retinal scanners, etc. The combinations are limited only by the capabilities of the hostless communication link and the ability to include the communications interface in the gaming component.

The access doors 28 provide interior access to the gaming system components inside the cabinet for service, removal and insertion of new components. Typically located inside the cabinet, in addition to the various controllers for the devices in the gaming system arranged in the cabinet, is a logic assembly 30 that may include the game processing unit. The game processing unit provides the logic components and the distribution media which contain the games that are played by the player on the system, although it is not necessary that the game processing unit be the provider of the games, as will be discussed in more detail later.

The player interacts with the games through the player controls 32 and the display/touch screen 34. The player's progress, as well as the player's account status and other player related information, may be tracked by a player tracking subsystem, 36, which may also be a logic circuit arranged in the cabinet but not always visible to the outside. All of the gaming components discussed so far, as well as many other possibilities, are all arranged in the cabinet and may or may not be visible to the player. Other components of the system may be outside of the cabinet, such as the external storage 42, connected to the components in the cabinet by the communications link 40, and overhead display 38. The overhead display 38 may take data from the camera 14 and display it so that others than the player may see video capture of the player's game, the player when he or she wins, etc.

These gaming components, whether inside or outside the cabinet, will have a controller of some sort and a communications interface allowing the controllers to access a common communications link among the various gaming components. The controllers may vary greatly between the devices. For example, the coin acceptor and bill acceptor may have simple logic circuits and sensors that identify the insertion of coin or currency, validate that the money is valid, and a simple counter that counts how much money has been inserted. These controllers may also have a rejection function that returns invalid money. Similarly, the coin hopper may have a controller that merely receives a signal to release a certain number of different kinds of coins as winnings.

In contrast, the camera controller may be a high-end video processor that reads signals from a charge-coupled device and converts it to digital video or still image data. Similarly, the player controls controller may be a simple voltage generator that generates a voltage for a particular button push, or may be much more complex input apparatus. The display/touch screen may also have a fairly complex controller, to allow rendering of video images, either from the camera or from a file, as well as receiving and interpreting touch screen inputs. The controllers of these devices, regardless of their complexity will govern the functioning of the gaming component as well as communicate through the communications link with other gaming components.

The gaming system should have some degree of flexibility, allowing gaming components to be switched in and out, added and removed to enhance the gaming experience. The communications link 40 that provides communications between all the components should allow this flexibility. One such communication link is a 'hostless' communications link, where the communications link, such as a bus, does not require one designated device to always function as the master communications controller, through which all the gaming components must communicate. Hostless communications system may have bus control functions, but any device with the appropriate capabilities may take those functions upon themselves, and the functions may be divided among several devices sharing the link.

An example of a hostless communication link is the communications protocol set out by the Institute of Electrical and Electronic Engineers (IEEE) standard 1394 (IEEE 1394), which may also be known as FireWire® a trademark of the Apple Computer Corporation or i.LINK® a trademark of Sony Corporation. The IEEE 1394 standard sets out a communications link that is reconfigurable, hostless and very flexible. It also has the capability to provide power through either the backplane or the cables to components, eliminating the need for separate power supplies and adding to the overall flexibility of the configuration. IEEE 1394 compliant communications links reconfigure themselves by the components communicating among themselves to determine who will fulfill what roles and what the relationships are among the various components. This will be discussed with regard to FIG. 2.

Figure 2:
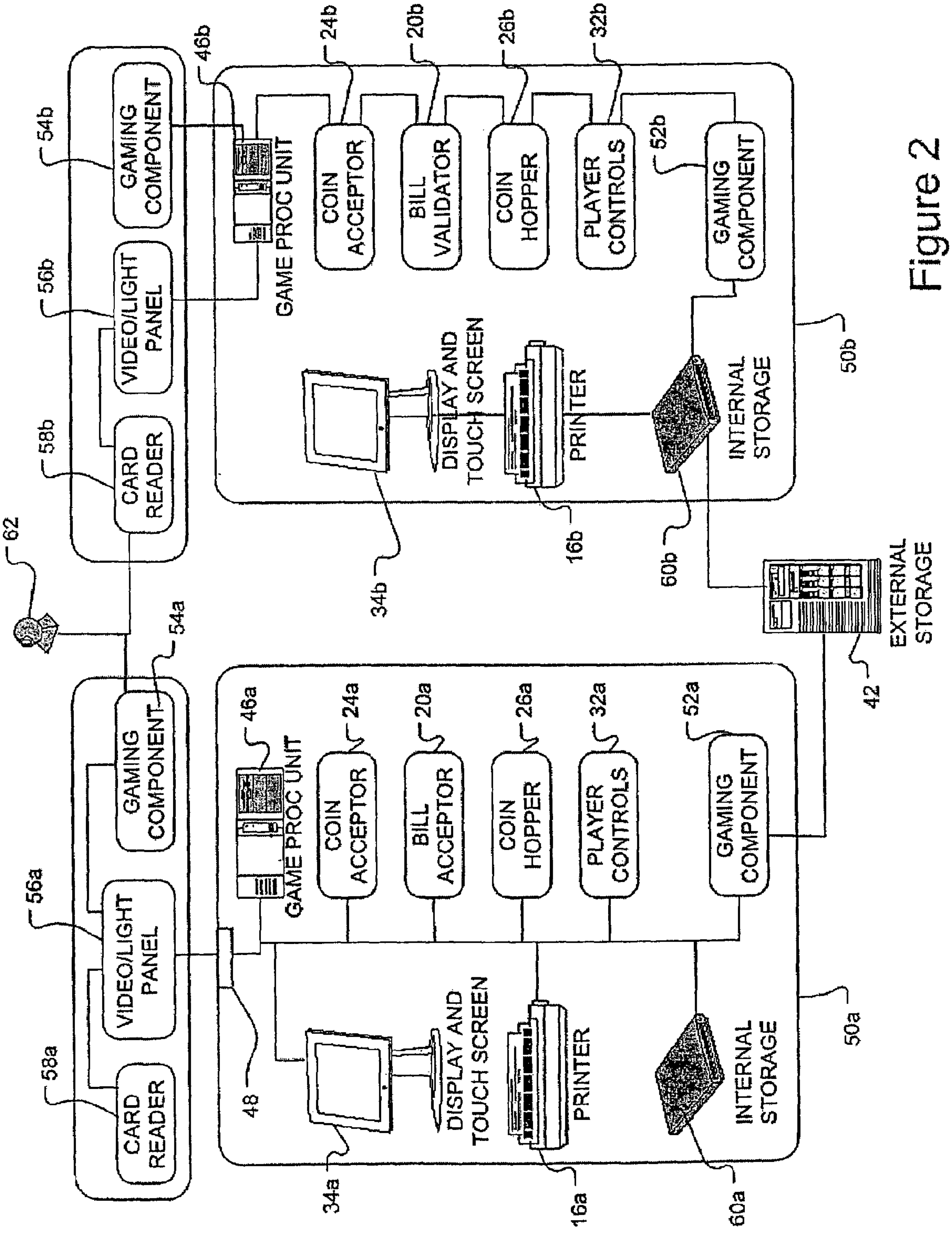
FIG. 2 shows a block diagram of gaming systems sharing components.

FIG. 2 shows two gaming systems 50*a* and 50*b* with interior and exterior gaming components, as well as some shared gaming components. All of these gaming components communicate on a peer-to-peer basis, with no dedicated master controller that always manages the communications link between the devices. The elimination of a host allows the gaming system to be reconfigured without concern for communications management. For example, in many current systems, a master controller manages the communications link. Any changes to the master controller, or if the master controller fails, renders the entire gaming system inoperative, as none of the other gaming components can communicate without the master controller.

The hostless communication link may be configured as a backplane bus, where the components have an adapter that allows them to be 'plugged' into a slot on the gaming system backplane, or may be a cable link, where devices all use the same type of cable to communicate through their communications interfaces. In addition, these links may be bridged together. This provides two communications links, one for the gaming components interior to the cabinet, and a communication link between the components in the cabinet and components outside the cabinet. In addition, for the added flexibility of adding components that do not have their own power supplies, the communications link should also provide power, via a backplane or through the cable.

An example of a gaming system having both an interior communications link in the form of a backplane bus and a cable communications link for gaming components outside of the cabinet is shown in gaming system 50*a*. The display and touch screen 34*a*, the printer 16*a*, the internal storage 60*a*, the game processing unit 46*a*, the coin acceptor 24*a*, the bill acceptor 20*a*, the coin hopper 26*a*, the player controls 32*a* and the unspecified gaming component 52*a* all communicate with each other and the bridge 48 via a backplane hostless bus. The unspecified gaming component 52*a* can be any type of gaming component that the system designer desire, with the understanding that the system designer can add additional components as the designer sees fit.

Components outside the cabinet may communicate via a cabled communications link through the bridge 48, such as the card reader 58*a*, the video light panel 56*a* and any other gaming components such as 54*a*. The exterior or interior gaming components may in turn communicate with other devices that are shared among gaming systems, such as video camera 62. In addition, external devices may communicate by being cabled to an interior device, such as the external storage 42 being linked with the gaming component 52*a*.

In contrast, gaming system 50*b* has all of the devices cabled together in one communications link. In either system, the hostless communications link allows high degrees of flexibility in communications that are useful in the gaming environment. For example, in the IEEE 1394 hostless communications link, the bus is reconfigured every time a device is added or removed. This reconfiguration is sometimes referred to as 'reset.'

Upon reset, the communications interfaces of each component determine how many devices are attached to them. Components that have only one other component attached to them are called 'leaf nodes.' Typically, nodes with more than one component attached are called 'branch nodes,' and components that have three or more components are typically designated the 'root node.' In systems where there is more than one possible root node, the protocol defines a method for how to settle which node is the root node. Note that in gaming system 50*a*, the game processing unit 46*a* happens to be the root node. In gaming system 50*b*, the root node is the internal storage 60*a*. Once the tree structure is identified, the root nodes enumerate the components and notify all of the devices of everyone's identification. The devices can now communicate on a peer-to-peer basis, without interaction of any other gaming components.

In gaming system 50*b*, the display and touch screen 34*b* connects to the printer 16*b*, which in turn connects to the internal storage 60*b*. The internal storage 60*b* connects to the external storage 42 and the gaming component 52*b*. The gaming component 52*b* and any intervening gaming components connect with the player controls 32*b*, in turn connecting to the coin hopper 26*b*. This arrangement is repeated between the coin hopper 26*b*, the bill validator 20*b*, the coin acceptor 24*b*, the game processing unit 46*b* and the external devices. Note that the gaming system 50*b* does not require a bridge, as there is only one cabled together system. The communications link will not make any differentiation on the physical level between any of the interior gaming components and the exterior gaming components such as the card reader 58*b*, the video/light panel 56*b* and the gaming component 54*b* as well as any others.

In this manner, the gaming systems can be reconfigured easily and with minimum interruption of the gaming experience for the player. For example, one of the gaming components may be a slot machine interface board (SMIB). The SMIB may communicate across a network with a slot accounting system that provides ticket validation. Once the validation is received at the SMIB, in this example gaming component 52*b*, the print commands could be forwarded to the printer 16*b* without having to involve the gaming processing unit 46*b*.

In another example, a remote game server may be used to "push" game content to the gaming system. In this example, the external storage 42 may be an external application server that provides dynamic, configurable content for players. The server 42 would then be able to communicate directly with the various gaming components needed for the game, such as the display, the player controls and the printer, without involving the CPU.

There are instances when the management system needs to take the game system offline for a period of time. Currently, the management system sends a message down to the gaming system via a serial protocol which is received and processed by the game processing unit, which in turn disables the player controls, bill acceptor and touch screen until such time as the game processing unit is reactivated. This disallows all interaction between the game and the player until such time as the management system reactivates the gaming system via another message that is read by the game, processed, and then the game re-enables the player controls, touch screen, etc.

After implementing embodiments of this invention, the disable message would come in, be read by an intelligent gaming component such as the SMIB or other root node, which would communicate directly with the peripherals, leaving the game processing unit out of the loop.

In another example, a sequence of events would start when someone opens an access door. Currently, that signal is received, processed by the game processing unit, and then certain actions are taken, such as player controls disabled, ticket printers disabled, etc., by the game processing unit. In a hostless communication system, the root node may detect that event, and sends a broadcast message to all other components to disable themselves. The root node may or may not be the game processing unit. In the instance where it is not the root node, the game processing unit would be considered to be 'just another' gaming component.

As can be seen, the examples of the operation of this type of gaming system are wide and varied. Although there has been described to this point a particular embodiment for a method and apparatus for a gaming system, it is not intended that such specific references be considered as limitations upon the scope of this invention except in-so-far as set forth in the following claims.

What is claimed is:

1. A gaming system, comprising:

a hostless communications link;

at least three gaming components, each gaming component comprising:

a controller, and a communications interface; and a connector for connecting each interface to the communications link, the hostless communications link allowing each controller of other gaming components to communicate with each of the other controllers of other gaming components on a peer-to-peer basis without a master controller to control communications through the communications interfaces.

2. The gaming system of claim 1, wherein one of the at least three gaming components comprises a game processing unit.

3. The gaming system of claim 1, wherein said at least three gaming components comprises three gaming components operable to communicate directly with one another without processing or transmitting by a game processing unit.

4. The gaming system of claim 2, wherein the link to allow communications between the other components without any interaction of the game processing unit.

5. The gaming system of claim 1, wherein said at least three gaming components are selected from the group comprised of: a gaming processing unit, a camera, a printer, a storage device, a coin hopper, a light display, a button panel, a ticket reader, a bill validator, a speaker, a microphone, a card reader, a biometric device, and a keypad.

6. The gaming system of claim 1, wherein the link to allow communications between the other components without any interaction of a game processing unit.

7. The gaming system of claim 1, the gaming system further comprising a second hostless communications link, wherein one of either the hostless communications link or the second hostless communications link is used by the gaming components arranged in a cabinet and the other of the links is used for communications between each of the gaming components arranged in the cabinet and components located outside of the cabinet.

8. The gaming system of claim 1, the hostless communications link further to allow the gaming components to be added and removed while power is on.

9. The gaming system of claim 1, the hostless communications link further to provide power to at least one gaming component.

10. The gaming system of claim 1, the hostless communications link further comprising a link compliant with IEEE 1394.

11. A gaming system, comprising:

at least three gaming components, at least two being arranged in a cabinet and at least one being located outside the cabinet, each gaming component comprising:

a controller, and a communications interface;

an interior hostless communications link to allow each of the controllers in the gaming components arranged in the cabinet to communicate with each of the other components arranged in the cabinet in a peer-to-peer fashion without a host;

an exterior hostless communications link to allow each of the controllers in the gaming components arranged in the cabinet to communicate with the controller of the gaming component located outside the cabinet in a peer-to-peer fashion without a host; and a bridge to provide connection between the interior hostless communications link and the exterior hostless communications link.

12. The gaming system of claim 11, wherein one of said at least two gaming components arranged in the cabinet comprises a game processing unit.

13. The gaming system of claim 11, wherein said at least two gaming components arranged in the cabinet comprise at least two gaming components operable to communicate directly with one another without processing or transmitting by a game processing unit.

14. The gaming system of claim 11, wherein the interior hostless communications link comprises an IEEE 1394 backplane communications bus.

15. The gaming system of claim 11, wherein the exterior hostless communications link further comprises an IEEE 1394 cabled communications bus.

16. The gaming system of claim 11, the exterior hostless communications link further to provide to at least one gaming component remote from the cabinet.

17. The gaming system of claim 11, the gaming component outside the cabinet comprising a card reader.

18. The gaming system of claim 11, the gaming component outside the cabinet comprising a video light panel.

19. The gaming system of claim 11, the gaming component outside the cabinet comprising a video camera.

20. The gaming system of claim 11, the gaming component outside the cabinet comprising external data storage.

* * * * *